US011464163B2

(12) United States Patent
Bejcek

(10) Patent No.: US 11,464,163 B2
(45) Date of Patent: Oct. 11, 2022

(54) PROPULSION CONTROL SYSTEM FOR A WALK-BEHIND SELF-PROPELLED MACHINE, A LAWNMOWER, AND METHOD FOR CONTROLLING A LAWNMOWER

(71) Applicant: Honda Motor Co., Ltd., Tokyo (JP)

(72) Inventor: Andrew E. Bejcek, Chapel Hill, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 622 days.

(21) Appl. No.: 16/549,118

(22) Filed: Aug. 23, 2019

(65) Prior Publication Data

US 2021/0051848 A1 Feb. 25, 2021

(51) Int. Cl.
| A01D 34/68 | (2006.01) |
| A01D 34/00 | (2006.01) |
| A01D 34/78 | (2006.01) |
| A01D 34/69 | (2006.01) |
| A01D 101/00 | (2006.01) |

(52) U.S. Cl.
CPC ....... *A01D 34/6806* (2013.01); *A01D 34/006* (2013.01); *A01D 34/69* (2013.01); *A01D 34/78* (2013.01); *A01D 2034/6843* (2013.01); *A01D 2101/00* (2013.01)

(58) Field of Classification Search
CPC .. A01D 34/6806; A01D 34/006; A01D 34/69; A01D 34/78; A01D 2034/6843; A01D 2101/00
See application file for complete search history.

(56) References Cited

U.S. PATENT DOCUMENTS

| 6,983,583 | B2 | 1/2006 | Bucher |
| 8,352,116 | B2* | 1/2013 | Boylston ................. G01C 9/00 |
| | | | 701/29.1 |
| 9,616,893 | B2* | 4/2017 | Bejcek ................. A01D 34/006 |
| 10,070,581 | B2 | 9/2018 | Kuriyagawa et al. |
| 2005/0108999 | A1* | 5/2005 | Bucher .................. A01D 75/28 |
| | | | 56/10.2 R |
| 2017/0280623 | A1* | 10/2017 | Yamamura ........... G05D 1/0265 |
| 2018/0184585 | A1 | 7/2018 | Song et al. |
| 2018/0184586 | A1 | 7/2018 | Song et al. |
| 2019/0021223 | A1* | 1/2019 | Xu .......................... A01D 34/69 |
| 2021/0064036 | A1* | 3/2021 | Muro ................... G05D 1/0272 |
| 2022/0124971 | A1* | 4/2022 | Nonaka ................ A01D 34/006 |

\* cited by examiner

*Primary Examiner* — Abigail A Risic
(74) *Attorney, Agent, or Firm* — Kenealy Vaidya LLP

(57) ABSTRACT

A propulsion control system for a walk-behind self-propelled machine including a drive transmission and at least one wheel selectively driven by the drive transmission can include a sensor array and a controller. The sensor array can be configured to measure a first angular velocity about a first rotational axis of the machine and a second angular velocity about a second rotational axis of the machine, where the second rotational axis is different from the first rotational axis. The controller can be in electrical communication with the sensor array and configured to place the drive transmission in an off state when the drive transmission is in an on state, the first angular velocity is greater than a first threshold, and the second angular velocity is greater than a second threshold.

20 Claims, 5 Drawing Sheets

PROPULSION CONTROL SYSTEM FOR A WALK-BEHIND SELF-PROPELLED MACHINE, A LAWNMOWER, AND METHOD FOR CONTROLLING A LAWNMOWER

BACKGROUND

The disclosed subject matter relates to a self-propelled walk-behind machine. More particularly, the disclosed subject matter relates to methods and apparatus that automatically control the drive speed of the machine.

Walk-behind machines, such as but not limited to lawnmowers, can include a drive assembly that propels the machine along a travel surface. The drive assembly can be coupled to a power source such as but not limited to an internal combustion engine or an electric motor. The drive assembly can include one or more user inputs that can permit an operator of the machine to manually vary the speed at which the drive assembly propels the machine. Some user inputs are configured to either drive the machine at a single predetermined speed or to not propel the vehicle. Other user inputs are configured to permit the operator to vary the speed at which the drive assembly propels the machine between a range of speeds that can be varied continuously or in steps between a maximum speed and zero speed.

SUMMARY

Some embodiments are directed to a propulsion system for a walk-behind self-propelled machine including a drive transmission and at least one wheel selectively driven by the drive transmission. The system can include a sensor array and a controller. The sensor array can be configured to measure a first angular velocity about a first rotational axis of the machine and a second angular velocity about a second rotational axis of the machine, where the second rotational axis is different from the first rotational axis. The controller can be in electrical communication with the sensor array and configured to place the drive transmission in an off state when the following occurs: the drive transmission is in an on state; the first angular velocity is greater than a first threshold; and a second angular velocity is greater than a second threshold.

Some embodiments are directed to a lawnmower that can include a cutter housing, a blade assembly, a plurality of wheels, a handle, a drive assembly, and a main controller. The blade can be rotatably supported in the cutter housing. The plurality of wheels can support the cutter housing. The handle can be connected to the cutter housing and extend away from the cutter housing. The drive assembly can be mounted to the cutter housing, connected to at least one of the wheels, and configured to selectively drive the at least one wheel. The main controller can be in electrical communication with the drive assembly and configured to, select one of a first mode and second mode based on a first angular velocity of the lawnmower measured about a first rotational axis and a second angular velocity of the lawnmower measured about a second rotational axis that is different from the first rotational axis, cause the drive assembly to drive the at least one of the wheels at first speed when the main controller is in the first mode, and cause the drive assembly to drive the at least one of the wheels at a second speed when the main controller is in the second mode, where the second speed is less than the first speed. For example, the second speed can have a zero value or power to the drive transmission can be turned off.

Some embodiments are directed to a lawnmower that can include a cutter housing, a blade, a plurality of wheels, a handle, a drive assembly and a sensor array. The blade can be rotatably supported in the cutter housing. The plurality of wheels can support the cutter housing. The handle can be connected to the cutter housing and extend away from the cutter housing. The drive assembly can be mounted to the cutter housing, connected to at least one of the wheels, and configured to selectively drive the at least one wheel. The sensor array can be configured to measure a first angular velocity about a first rotational axis of the lawnmower and a second angular velocity about a second rotational axis of the lawnmower, where the second rotational axis is different from the first rotational axis.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
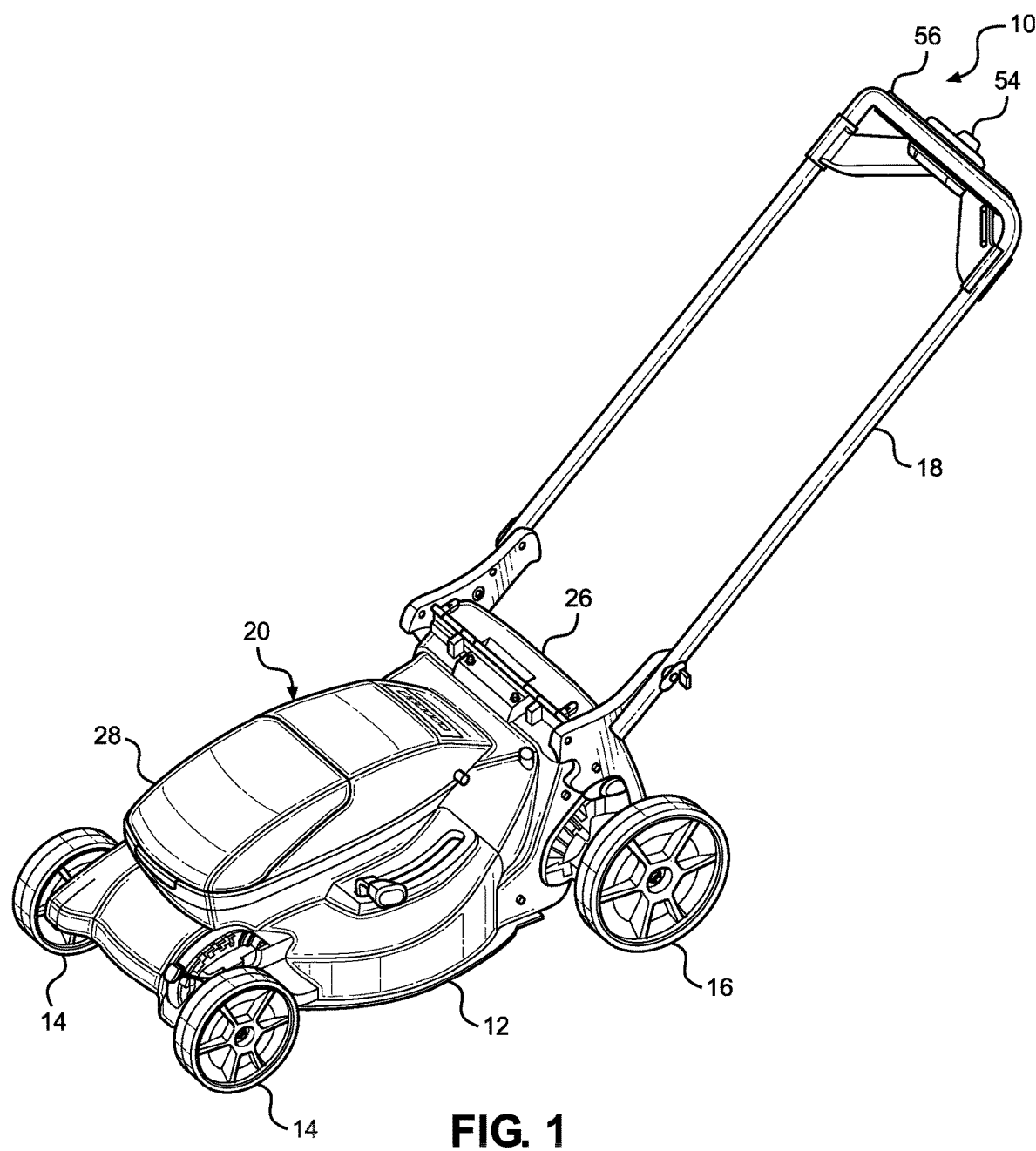
FIG. 1 is a perspective view of a lawnmower made in accordance with principles of the disclosed subject matter.

Exemplary embodiments of a walk-behind self-propelled machine made in accordance with principles of the disclosed subject matter can include but are not limited to a lawnmower, a tiller, a lawn edger, an aerator, and a snowblower. FIG. 1 illustrates an exemplary embodiment of a walk-behind self-propelled machine that is configured as a lawnmower 10.

Figure 2:
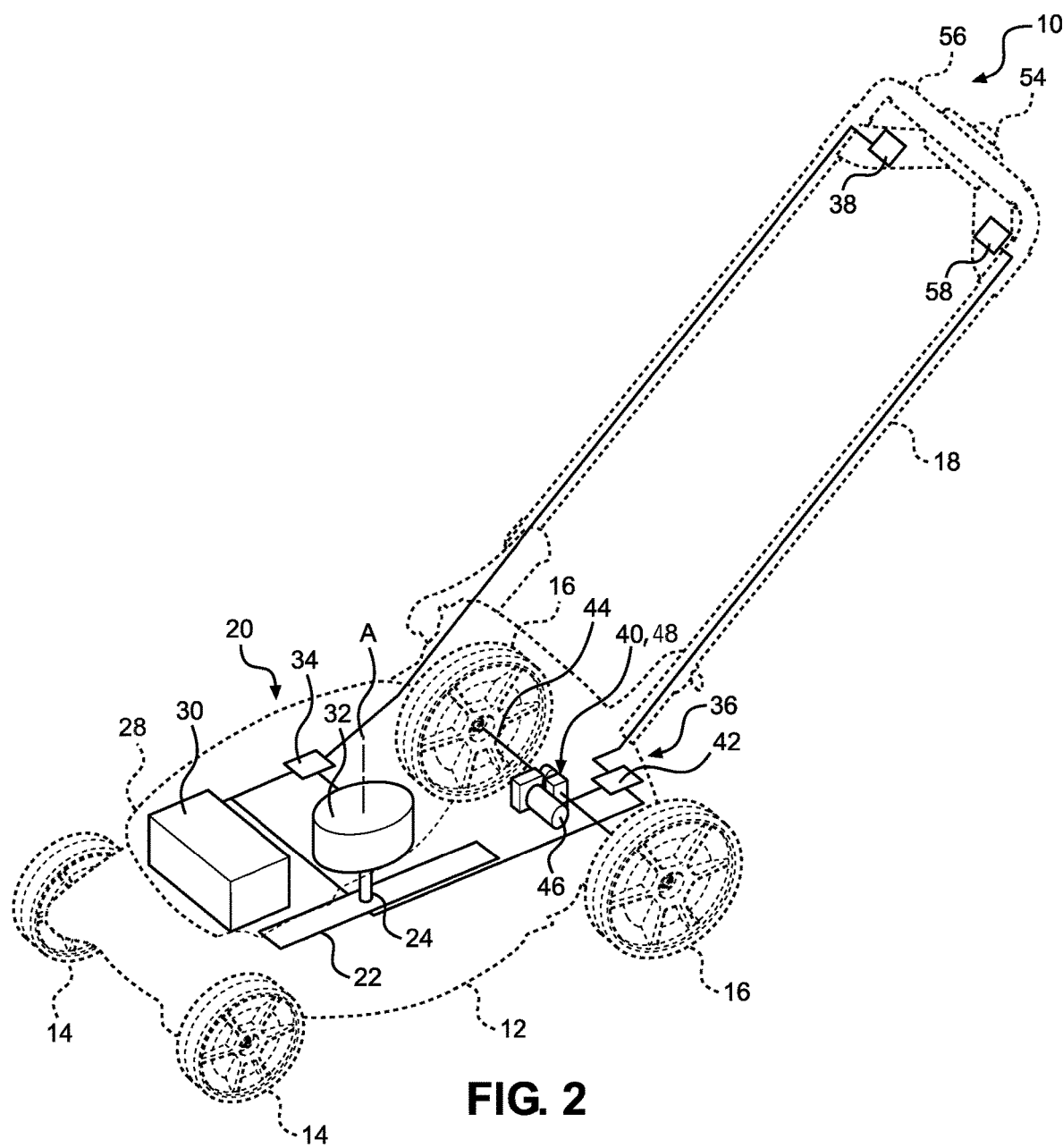
FIG. 2 is perspective view of a power source assembly for operating a cutting blade and propelling the lawnmower of FIG. 1, with exterior portions of the lawnmower shown in phantom.

The lawnmower 10 can include a cutter housing 12, a pair of front wheels 14, a pair of rear wheels 16, a handle 18 and a power source assembly 20. The rear wheel 16 on the right side of the lawnmower is obstructed from view in FIG. 1 by the cutter housing 12. FIG. 2 shows the right rear wheel 16 in phantom.

As will be discussed in further detail below, the power source assembly 20 can be configured to selectively drive the rear wheels 16 based on one or more user inputs. For example, the power source assembly 20 can be configured to automatically terminate driving the rear wheels 16 based on one or more specific dynamic conditions of the lawnmower 10. The power source assembly 20 can be configured to automatically return to the user requested speed based on one or more specific dynamic conditions of the lawnmower 10 when the power source assembly 20 has terminated driving the rear wheels 16. For example, the power source assembly 20 can be configured to automatically terminate driving the rear wheels 16 while an operator of the lawnmower 10 tilts and turns the lawnmower at the end of a completed row of cut vegetation to begin a new row for cutting the vegetation. Alternate embodiments of the power source assembly 20 can reduce the speed at which the power source assembly 20 drives the rear wheels 16 as the operator transitions the lawnmower 10 from a competed row to a new row, where the reduced speed is less than a speed at which the operator might manually push the lawnmower 10 during the transition from a completed row of cut vegetation to a new row of vegetation to be cut.

Referring to FIG. 2, the lawnmower 10 can include a blade 22 and a blade shaft 24 connected to each of the blade 22 and the power source assembly 20. The power source assembly 20 can be configured to selectively rotate the blade shaft 24 and the blade 22 in the cutter housing 12 about a blade axis A. The blade shaft 24 can be referred to as a component of the power source assembly 20. Alternatively, the blade shaft 24 can be referred to as a component that is connected to and driven by the power source assembly 20.

The cutter housing 12 can be referred to as a mower deck or as a cutter deck or as a deck. Referring to FIG. 1, the cutter housing 12 can include an opening at a rear end 26 of the cutter housing 12. The lawnmower 10 can include a collection bag that can be selectively attached to and detached from the rear end 26. The opening and the collection bag are omitted for simplicity and clarity of the drawing figures. The collection bag can be in communication with the opening such that vegetation clippings produced by the blade 22 can be collected in the collection bag.

FIG. 2 schematically illustrates exemplary components of the power source assembly 20. The power source assembly 20 can include a housing 28 (shown in phantom), a battery pack 30, a blade motor 32, a blade motor driver 34, a drive assembly 36 and a control assembly 38. Referring to FIGS. 1 and 2, the housing 28 can contain the battery pack 30, the blade motor 32 and the blade motor controller 34. The drive assembly 36 can be spaced away from the housing 28.

The battery pack 30 can include at least one battery cell and a case that houses the at least one battery cell. The battery cell can be configured to store electricity and supply electricity to the blade motor 32.

The blade motor 32 can be a direct current electric motor or an alternating current electric motor. Embodiments can include a blade motor 32 that is configured as a direct current outer rotor motor that includes an inner stator and an outer rotor. The blade motor 32 can include one or more sensors that provide the blade motor driver 34 with information regarding the temperature, rotational speed, power output, etc., of the blade motor 32. The outer rotor of the blade motor 32 can be directly connected to the shaft 24 in any appropriate manner such that the blade motor 32 can cause the blade shaft 24 to rotate.

The blade motor driver 34 can be in electrical communication with each of the battery 30 and the blade motor 32. The blade motor driver 34 can be configured to convert power from the battery pack 30 into output power supplied to the blade motor 32. The blade motor driver 34 can be configured to monitor the operational conditions of the blade motor 32 and the battery pack 30. The blade motor driver 34 can be configured to control the voltage and/or current output by the battery pack 30 based on the operational conditions of the blade motor 32 and the battery pack 30 switching one or more power transistors to adjust the supply of electrical power to the blade motor 32.

The blade motor driver 34 can also be configured to control the voltage or current output by the battery pack 30, and to supply the voltage or current to the blade motor 32 using the one or more power transistors based on one or more inputs to the control assembly 38 by the operator of the electric lawnmower 10.

The blade motor driver 34 can be in electrical communication with each of the control assembly 38, the blade motor 32 and the battery pack 30. The blade motor driver 34 can be configured to initiate, adjust or terminate supply of voltage or current from the battery pack 30 to the blade motor 32 based on inputs received from the control assembly 38, the battery pack 30 and the blade motor 32. The blade motor driver 34 can also be configured to regulate the charging of the battery cell(s) of the battery pack 30.

The control assembly 38 can be mounted on the handle 18 in any appropriate position and orientation on the handle 18 that can facilitate actuation by an operator of the lawnmower 10. The control assembly 38 can be configured to actuate one or more operational features of the lawnmower 10. In one exemplary embodiment, the control assembly 38 can be configured to cause the blade motor driver 34 to energize the blade motor 32 and rotate the blade 22. The control assembly 38 can be electrically connected to the blade motor driver 34. The control assembly 38 can include a switch configured to selectively place the power source assembly 20 in an "ON" state in which the blade motor driver 34 is electrically connected to the battery pack 30, or in an "OFF" state in which the blade motor driver 34 is electrically disconnected from the battery pack 30.

The drive assembly 36 can be mounted to the cutter housing 12 at a position that is underneath the cutter housing 12. The drive assembly 36 can include a drive transmission 40 and a propulsion motor driver 42. The propulsion motor driver 42 can be in electrical communication with each of the battery pack 30 and the drive transmission 40. A drive shaft 44 can be connected to each of the drive transmission 40 and the rear wheels 16 in any appropriate manner such that the drive transmission 40 can cause the drive shaft 44 to rotate, which in turn can cause the rear wheels 16 to rotate.

The drive transmission 40 can also include a propulsion motor 46 and a gear transmission 48 connecting the propulsion motor 46 to the drive shaft 44. The propulsion motor 46 can be a direct current electric motor or an alternating current electric motor. The propulsion motor 46 can include one or more sensors that provide the blade motor driver 34 with information regarding the temperature, rotational speed, power output, etc., of the propulsion motor 46.

The propulsion motor driver 42 can be in electrical communication with each of the battery pack 30 and the propulsion motor 46. The propulsion motor driver 42 can be configured to convert power from the battery pack 30 into output power supplied to the propulsion motor 46. The propulsion motor driver 42 can be configured to monitor the operational conditions of the propulsion motor 46 and the battery pack 30. The propulsion motor driver 42 can be configured to control the voltage or current output by the battery pack 30 based on the operational conditions of the propulsion motor 46 and the battery pack 30 by switching one or more power transistors to adjust the supply of electrical power to the propulsion motor 46.

The propulsion motor driver 42 can also be configured to control the voltage or current output by the battery pack 30, and to supply the voltage or current to the propulsion motor 46 based on one or more inputs by the operator of the electric lawnmower 10 using the one or more power transistors.

The propulsion motor driver 42 can be configured to initiate, adjust or terminate supply of voltage or current from the battery pack 30 to the propulsion motor 46 based on inputs received from the battery pack 30, the propulsion motor 46 and one or more input structures mounted on the handle 18 or other appropriate location. Further details of the one or more input structures are described below.

Figure 3:
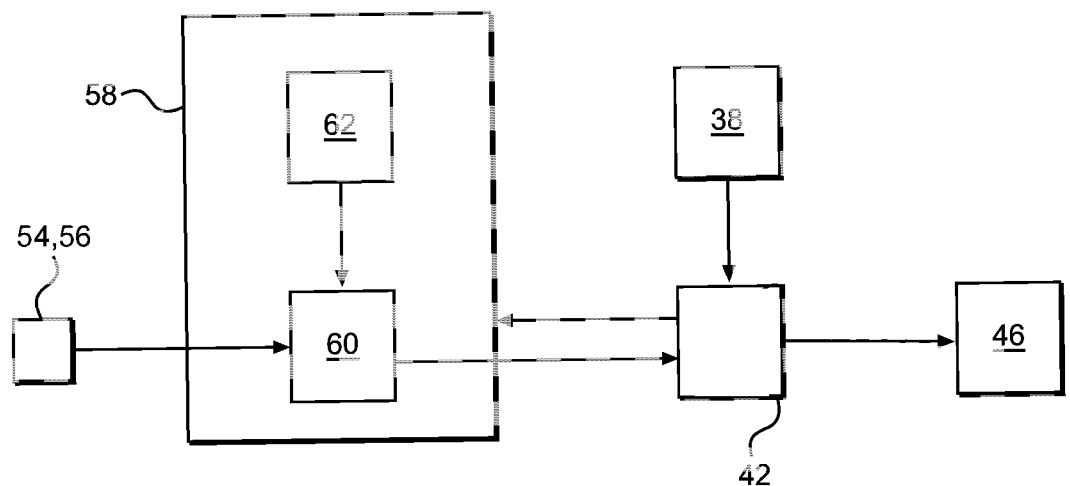
FIG. 3 is a schematic diagram of an electrical circuit for the lawnmower of FIG. 1.

The lawnmower 10 can include at least one input structure mounted on the handle 18 (or other location) that is configured to facilitate control of the drive assembly 36 by the operator of the lawnmower 10. Referring to FIGS. 1-3, the input structure can include a speed limit dial 54 and a speed control selector 56.

The speed limit dial 54 can be rotary encoder switch mounted on the handle 18. The speed limit dial 54 can be configured to permit the operator of the lawnmower 10 to set a maximum speed value from a range of possible maximum speed values at which the drive assembly 36 will propel the lawnmower 10.

The speed control selector 56 can be a lever that is pivotally mounted on the handle 18. The speed control selector 56 can be configured to permit the operator of the lawnmower 10 to adjust the speed at which the drive assembly 36 propels the lawnmower 10 between zero and the maximum speed set via the a speed limit dial 54. The speed control selector 56 can be referred to as a clutch lever. The speed control selector 56 can be configured to allow the operator of the lawnmower to continuously vary the speed at which the drive assembly 36 propels the lawnmower. Alternative embodiments can include a speed control selector 56 that functions as an ON/OFF switch such that the drive assembly 36 propels the lawnmower 10 at the speed set by the speed limit dial 54 when in an ON position and terminates propulsion when the speed control selector 56 is in an OFF position. The speed control selector 56 can also be a blade brake lever such that the speed control selector 56 causes a brake assembly and/or the blade motor 32 to stop rotation of the blade 22 in certain conditions.

Figure 4:
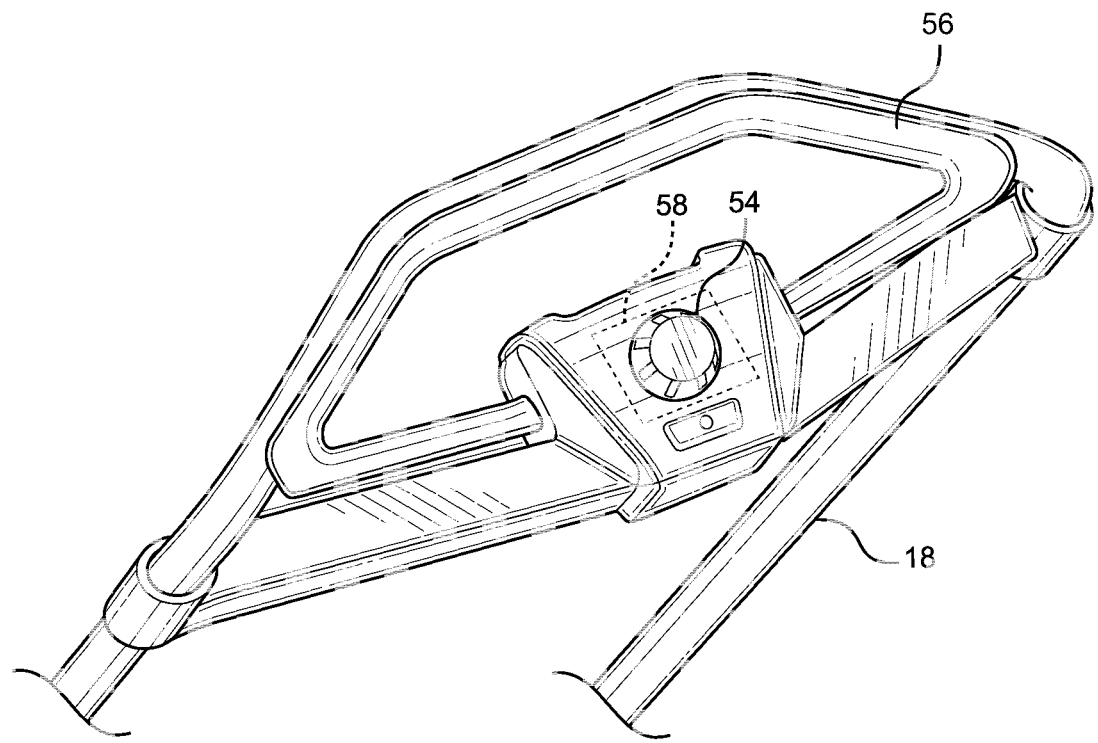
FIG. 4 is a partial perspective view of a handle of the lawnmower of FIG. 1.

Referring to FIGS. 2-4, the lawnmower 10 can include a printed circuit board 58. The printed circuit board 58 can be mounted in the handle 18 (or other location). FIG. 2 shows the printed circuit board 58 mounted in a first possible position in the handle 18. FIG. 4 shows the printed circuit board 58 mounted in a second possible position in the handle 18. Alternate embodiments can include a printed circuit board 58 mounted at any location in or on the handle 18 or spaced away from the handle 18. The printed circuit board 58 can be in electrical communication with each of the battery pack 30, the propulsion motor driver 42, the speed limit dial 54, and the speed control selector 56. Alternate embodiments can include the printed circuit board 58 mounted in any appropriate position on the lawnmower 10 in consideration of packaging space, desired performance specifications, ease of assembly, and/or ease of maintenance, etc.

Referring to FIG. 3, the lawnmower 10 can include a main controller 60 and a sensor array 62. The main controller 60 and the sensor array 62 can be mounted on and in electrical communication with the printed circuit board 58.

The main controller 60 can be in electrical communication with battery pack 30, the propulsion motor driver 42, the speed limit dial 54, the speed control selector 56 and the sensor array 62. The main controller 60 can be configured to signal the propulsion motor driver 42 to initiate, adjust or terminate supply of voltage or current from the battery pack 30 to the propulsion motor 46 based on inputs received from any of the battery pack 30, the propulsion motor 46, the speed limit dial 54 and the speed control selector 56.

The main controller 60 can be configured to operate in a first mode and in a second mode. In the first mode, the main controller 60 can be configured to cause the drive transmission 40 to propel the lawnmower 10 at a first speed which is set by the operator via the speed limit dial 54 and the speed control selector 56. The first speed can be referred to as a user requested speed. In the second mode, the main controller 60 can be configured to cause the drive transmission 40 to propel the lawnmower 10 at a second speed that is less than the first speed. The second speed can be a predetermined speed. Exemplary embodiments can include a main controller 60 that operates in a second mode such that the main controller 60 causes the drive transmission 40 to stop propulsion of the lawnmower 10 by placing the drive transmission 40 in an off state such that the drive transmission 40 does not cause the drive shaft 44 to rotate the rear wheels 16 of the lawnmower 10. Further details of the first and second modes of the main controller 60 are described below.

Figure 5:
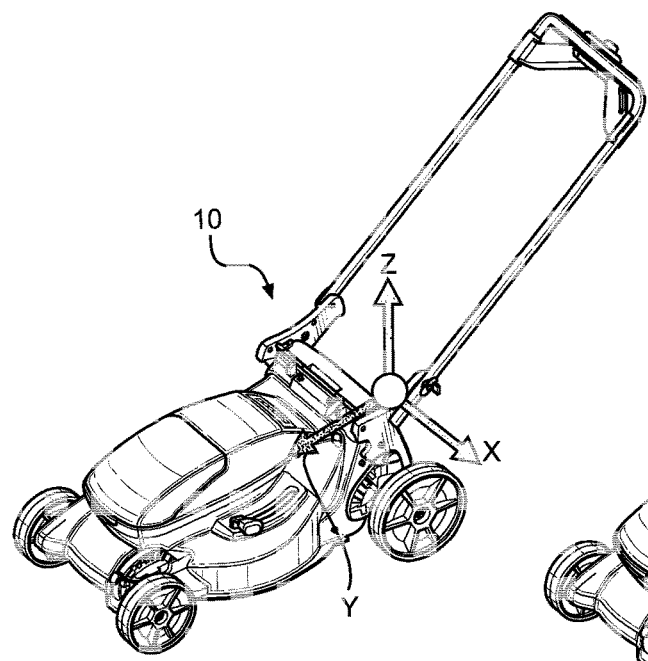
FIGS. 5-8 depict one or more rotational input(s) to the lawnmower of FIG. 1.

Referring to FIG. 5, the sensor array 62 can be configured to measure rotational motion of the lawnmower 10 about each of the X-axis, the Y-axis and the Z-axis. The sensor array 62 can include any appropriate type and number of sensor(s) that is/are configured to measure movement about each of the X-, Y- and Z-axes. For example, the sensor array 62 can include a three-axis gyroscope that is mounted on the printed circuit board 58. Alternate embodiments can include a sensor array 62 that includes at least two sensors, where each of the sensors is configured to measure rational motion of the lawnmower 10 about a respective one of the X-axis and the Z-axis.

FIGS. 5-8 illustrate a plurality of different dynamic inputs that the ground contour and/or an operator of the lawnmower 10 apply to the lawnmower 10 during operation of the lawnmower 10 that may or may not impart rotational motion about the X-axis, the Y-axis and/or the Z-axis.

FIG. 5 represents a dynamic state of the lawnmower 10 in which the lawnmower 10 travels along a substantially straight path on substantially flat ground. Thus, the lawnmower 10 does not rotate about any of the X-,Y- and Z-axes or only experiences a negligible rotation about any of the X-, Y- and Z-axes.

Figure 6:
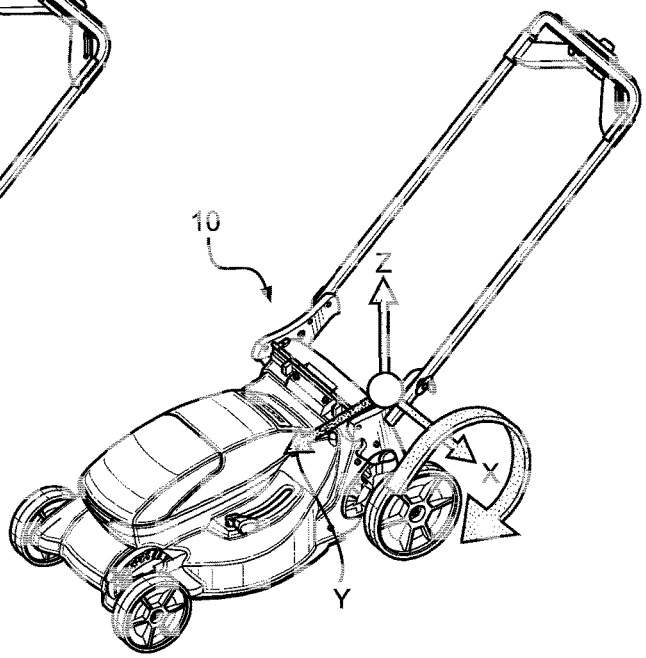

FIG. 6 represents a dynamic state of the lawnmower 10 in which the operator pivots the front wheels 14 away from the ground surface such that the lawnmower 10 rotates about the X-axis. If the arrow shown in FIG. 6 is reversed, the figure would represent a dynamic state of the lawnmower 10 in which the operator pivots the front wheels 14 toward the ground if the front wheels 14 have been pivoted away from the ground. FIG. 6 also represents a dynamic state of lawnmower 10 in which the lawnmower 10 transitions from a flat surface to an upwardly inclined surface (or, if arrow is reversed, from an upwardly inclined surface to a flat surface. Thus, FIG. 6 represents rotational movement of the lawnmower 10 either clockwise or counterclockwise about the X-axis.

Figure 7:
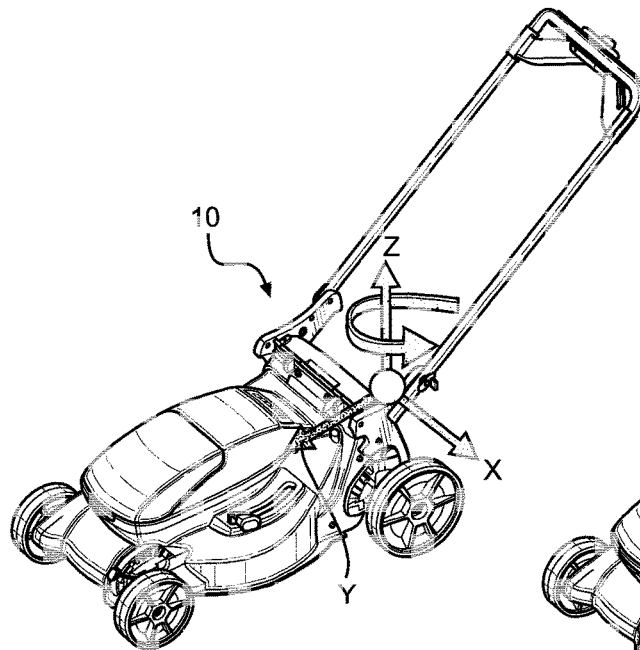

FIG. 7 represents a dynamic state of the lawnmower 10 in which the operator turns the front wheels 14 toward the operator's left (or, if arrow is reversed, to the right) such that the lawnmower 10 rotates about the Z-axis. Thus, FIG. 7 represents rotational movement of the lawnmower 10 either clockwise or counterclockwise about the Z-axis.

Figure 8:
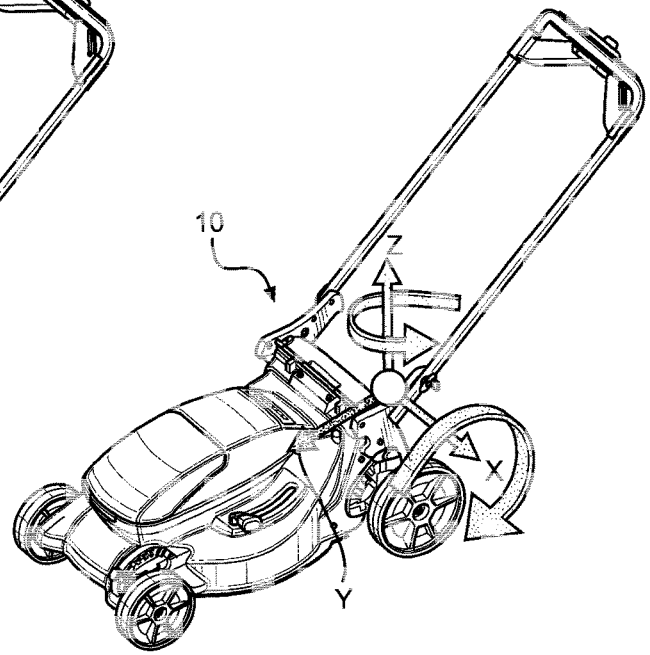

FIG. 8 represents a dynamic state of the lawnmower 10 in which the lawnmower 10 rotates either clockwise or counterclockwise about the X-axis and, simultaneously, rotates clockwise or counterclockwise about the Z-axis. This dynamic state can occur when an operator pivots the lawnmower 10 at the end of a completed row of cut vegetation and begins a new row of vegetation to be cut. This dynamic condition can also occur when the operator directs the lawnmower 10 along a curved path as the lawnmower 10 transitions between a flat ground surface and an inclined ground surface.

Operating the main controller 60 in the first mode can be advantageous in each of the dynamic states of the lawnmower 10 shown in FIGS. 5-7. Operating the main controller 60 in the first mode can be advantageous under many dynamic conditions shown in FIG. 8. In contrast, operating the main controller 60 in the second mode can be advantageous under special dynamic condition(s) shown in FIG. 8, such as when the lawnmower transitions from a completed row of cut vegetation to a new row of vegetation to be cut.

Figure 9:
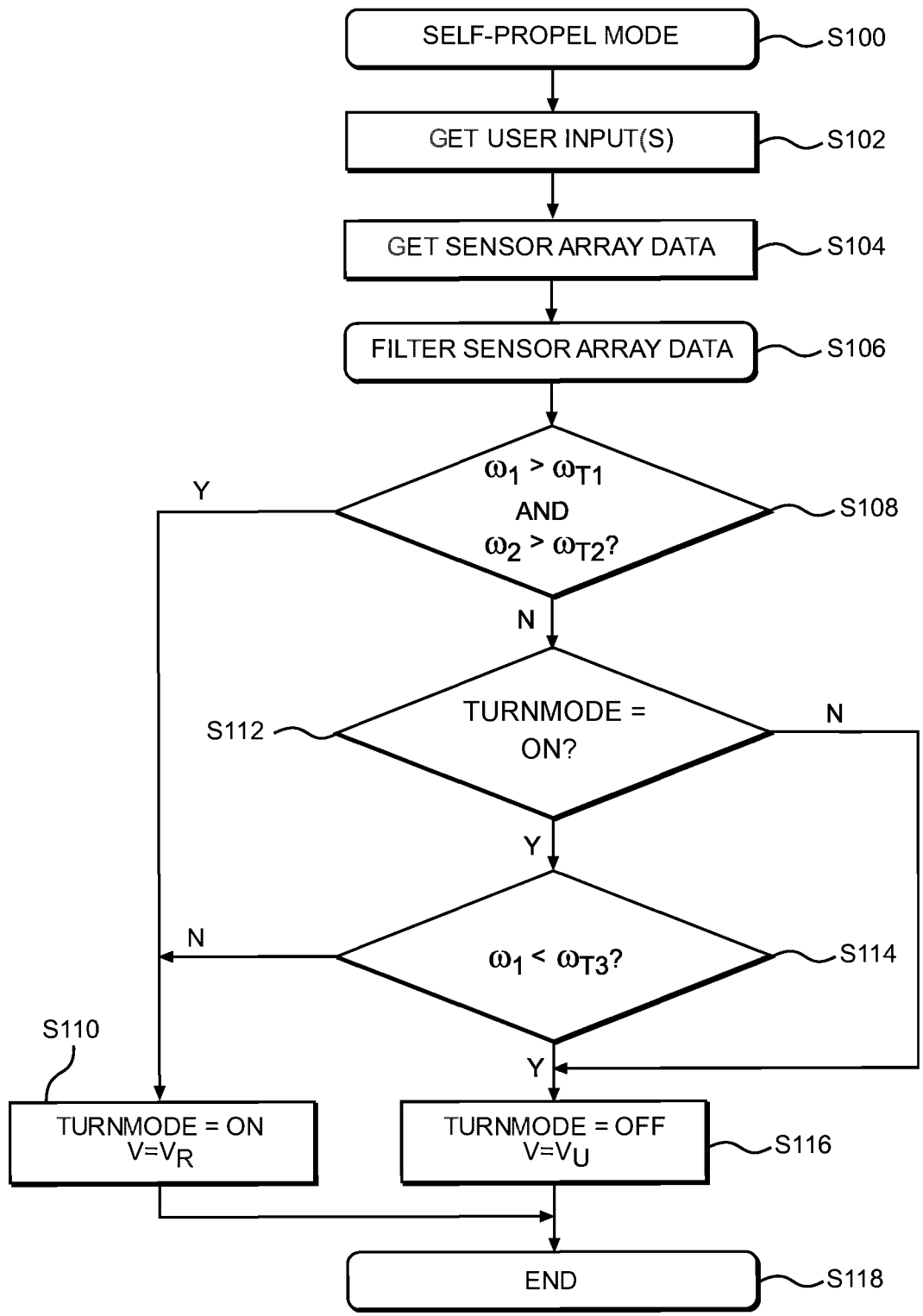
FIG. 9 is a flowchart depicting an exemplary algorithm in accordance with the disclosed subject matter.

FIG. 9 illustrates an exemplary flowchart of a self-propel mode algorithm that can be executed by the main controller 60 to determine whether the main controller 60 can operate in the first mode or in the second mode. The main controller 60 can be configured to initialize one or more variables of the self-propel mode when an operator of the lawnmower 10 transitions the lawnmower 10 from an off state in which the lawnmower 10 is not in use to an on state in which at least one of the blade motor driver and the main controller 60 are receptive to input(s) from the operator via the control assembly 38 and/or the speed limit dial 54. For example, the main controller 60 can be configured to set an initial value of the variable, TURNMODE, to equal "OFF" when the operator changes the lawnmower 10 from the off state to the on state.

The main controller 60 can begin the self-propel mode at step S100. From step S100, the main controller 60 can proceed to step S102.

At step S102, the main controller 60 can obtain input from the speed limit dial 54 and the speed control selector 56 so that the main controller 60 can cause the drive transmission 40 to propel the lawnmower 10 in accordance with a speed desired by the operator of the lawnmower 10. From step S102, the main controller 60 can proceed to step S104.

At step S104, the main controller 60 can obtain data from the sensor array 62. The data from the sensor array 62 can be indicative of a first angular velocity $\omega_1$ and a second angular velocity $\omega_2$ of the lawnmower 10. The first angular velocity $\omega_1$ can be measured about a first rotational axis such as the Z-axis illustrated in FIGS. 5-8. The first angular velocity $\omega_1$ and the first rotational axis can also be referred to as a yaw rate and a yaw axis, respectively. The second angular velocity $\omega_2$ can be measured about a second rotational axis such as the X-axis illustrated in FIGS. 5-8. The second angular velocity $\omega_2$ and the second rotational axis can also be referred to as a pitch rate and a pitch axis, respectively. From step S104, the main controller 60 can proceed to step S106.

At step S106, the main controller 60 can enter a data filter subroutine in which the main controller 60 is configured to filter the data obtained from the sensor array 62. The raw data obtained from the sensor array can include spikes measured by the sensor array 62 if the lawnmower 10 traverses uneven or bumpy terrain. The data from the sensor array 62 may also be subject to other sources of noise. The data filter subroutine can cause the main controller 60 to smooth and eliminate these spikes and other sources of noise in the data obtained from the sensor array 62. Any appropriate mathematical filter can be used such as but not limited to a first order recursive filter as expressed by the equation:

filtered value=a0(current raw value)+b1(previous filtered value), where (a0+b1)=1.

A time constant of the filter can be adjusted by varying the coefficients a0 and b1. From step S106, the main controller 60 can proceed to step S108.

At step S108, the main controller 60 can begin a process of determining whether the main controller 60 can select the first mode, select the second mode, remain in the second mode or terminate the second mode and select the first mode. In dynamic conditions illustrated in FIGS. 5-7, the lawnmower 10 either does not experience any rotational motion about the X-, Y- and Z-axes or experiences angular rotation about only one of the X-, Y- and Z-axes. Thus, at step S108, the main controller 60 can rely on two angular velocities to determine whether the main controller 60 can select the first mode or the second mode. As a result, the main controller 60 can more efficiently and effectively operate in the first and second modes.

Specifically, the main controller 60 can compare the first angular velocity $\omega_1$ to a first threshold $\omega_{T1}$ and the second angular velocity $\omega_2$ to second threshold $\omega_{T2}$. If the first angular velocity $\omega_1$ is greater than the first threshold $\omega_{T1}$ and the second angular velocity $\omega_2$ is greater than the second threshold $W_{T2}$, then the main controller 60 can proceed to step S110 where the main controller 60 selects the second mode. However, if either the first angular velocity $\omega_1$ is less than or equal to the first threshold $\omega_{T1}$ or the second angular velocity $\omega_2$ is less than or equal to the second threshold $W_{T2}$, the main controller 60 can proceed to step S112 where the main controller 60 can continue the process of determining whether to select the first mode, remain in the second mode, or terminate the second mode and select the first mode.

The first and second thresholds $\omega_{T1}$, $\omega_{T2}$, can be set at respective predetermined angular velocity values that best or most likely correspond the rotational motion of the lawnmower 10 as the operator tilts and pivots the lawnmower 10 at the end of a completed row of vegetation and begins a new row of vegetation to be cut. The first and second thresholds $\omega_{T1}$, $\omega_{T2}$, can be set at a respective angular velocity value that can maintain the main controller 60 in the first mode or reduce a frequency at which the main controller 60 selects the second mode when the operator is turning the lawnmower 10 while traversing an inclined surface but not transitioning from a completed row of cut vegetation to a new row of vegetation to be cut.

At step S110, the main controller 60 can select the second mode. The main controller 60 can set a flag TURNMODE to equal "ON." The function of the flag TURNMODE is described below. The main controller 60 can determine the drive speed V at which the propulsion motor driver 42 causes the propulsion motor 46 to operate such that the operator perceives a satisfactory level of comfort, control and convenience while tilting and turning the lawnmower 10 to begin a new row of vegetation to be cut.

For example, the main controller 60 can set the drive speed V to equal a reduced speed $V_R$. The reduced speed $V_R$ can be any appropriate speed of the lawnmower 10 at which the operator can perceive as satisfactory in comfort, control and convenience while tilting and turning the lawnmower 10 to begin a new row of vegetation to be cut. In exemplary embodiments, the reduced speed $V_R$ can be a predetermined value such as but not limited to zero. That is, a value of zero for the reduced speed $V_R$ can place the drive transmission 40 in an off state such that the propulsion motor 46 does not rotate the drive shaft 44.

In alternate embodiments, the reduced speed $V_R$ can be a predetermined value that is greater than zero, a predetermined percentage of the maximum speed by the operator via the speed limit dial 54 or variable based on one or more of the angular velocities measured about each of the X-, Y- and Z-axes. In other exemplary embodiments, the reduced speed can be speed that is less than a speed at which the operator might manually push the lawnmower 10 during the transition from a completed row of cut vegetation to a new row of vegetation to be cut.

From step S110, the main controller 60 can proceed to step S118.

From step S108, the main controller 60 can proceed to step S112 if either one of the angular velocities $\omega_1$, $\omega_2$ is less than or equal to the respective one of the thresholds $\omega_{T1}$, $\omega_{T2}$. If either one of the angular velocities is less than the respective thresholds, then it may be likely that the operator is not transitioning the lawnmower 10 from a completed row to a new row, or has completed the transition. Thus, at step S112, the main controller 60 can determine whether or not the TURNMODE flag has been set to "ON." When the TURNMODE flag is set to "ON," the main controller 60 is operating in the second mode. When the TURNMODE flag is set to "OFF," the main controller 60 is operating in the first mode. If the TURNMODE flag is set to "ON," then the main controller 60 can proceed to step S114 to determine whether the main controller 60 can remain in the second mode or terminate the second mode. If the TURNMODE flag is set to "OFF," then the main controller 60 can proceed to step S116, where the main controller 60 can select the first mode.

At step S114, the main controller 60 is currently operating in the second mode. Step S114 can permit the main controller 60 to remain in the second mode or terminate the second and select the first mode. The main controller 60 can compare the first angular velocity $\omega_1$ with a third threshold $\omega_{T3}$. The third threshold $\omega_{T3}$ can be any appropriate predetermined value.

If first angular velocity $\omega_1$ is greater than or equal to the third threshold $\omega_{T3}$, then the operator may not have completed the transition from the complete row to the new row. Thus, the main controller 60 can proceed to step S110 if first angular velocity $\omega_1$ is greater than or equal to the third threshold $\omega_{T3}$ where the main controller 60 will remain in the second mode.

If first angular velocity $\omega_1$ is less than the third threshold $\omega_{T3}$, then it can be deemed that the operator has completed the transition from the complete row to the new row. Thus, the main controller 60 can proceed to step S116 if first angular velocity $\omega_1$ is less than the third threshold $\omega_{T3}$, where the main controller 60 can terminate the second mode and select the first mode.

At step S116, the main controller 60 can select the first mode. The main controller 60 can set a flag TURNMODE to equal "OFF." The main controller 60 can determine the drive speed V at which the propulsion motor driver 42 causes the propulsion motor 46 to operate based on the user request speed $V_U$. The main controller 60 can be configured to determine the user request speed $V_U$ from the operator's input to each of the speed limit dial 54 and the speed control unit 56 based on the equation:

$$V_U = R \times V_M$$

where $V_M$ is the maximum speed set by the user and R is a ratio that corresponds to a position of the speed control selector 56. For example, the speed control selector 56 can be movable between a fully engaged position, where the main controller causes the propulsion motor 46 to propel the lawnmower 10 at the maximum speed set by the operator via the speed limit dial 54, and a fully disengaged position where the man controller 60 causes the propulsion motor 46 to not rotate the drive shaft 44. The ratio R can be a percentage of the fully engaged position where R can have a value of 100% when the speed control lever 56 is in the fully engaged position and a value of 0% when the speed control lever 56 is in fully disengaged position (or percentages therebetween).

The main controller 60 can determine the maximum speed $V_M$ based on a position of the speed limit dial 54 and a look-up table that includes a plurality of dial positions and a corresponding plurality of possible maximum speeds. The look-up table can be stored in any appropriate electronic storage device. From step S116, the main controller 60 can proceed to step S118.

At step S118, the main controller 60 can exit the self-propel mode algorithm and/or can execute one or more subsequent iterations of the self-propel mode algorithm at any appropriate interval. An exemplary interval of 50 Hz can be set as the interval. However, any appropriate frequency can be used based on the desired performance of the main controller 60 and the physical properties of the main controller 60.

Thus, main controller 60 can be configured to automatically select and switch between the first mode and the second mode using two angular velocity values of the walk-behind self-propelled machine that are measured about two different rotational axes.

Each of the drivers 34, 42 and the main controller 60 can be referred to as an electronic control unit ("ECU") or as a central processing unit ("CPU") or as a microcontroller. The drivers 34, 42 and the main controller 60 can be configured with hardware, with or without software, to perform the assigned task(s). The drivers 34, 42 and the main controller 60 can include or be electrically connected to any appropriate memory device that can store and retrieve programs and/or data for use by the drivers 34, 42 and the main 60. Although the propulsion motor driver 42 and the main controller 60 are referred to separately, a single controller (instead of separate propulsion motor driver 42 and controller 60) can be used to perform the same or similar functions as the driver 42 and the main controller 60 and other control mechanisms including the blade motor driver 34.

Electrical communication lines (not numbered) can connect each of the drivers 34, 42 and the main controller 60 to one or more components of the power supply assembly 20 in any appropriate manner. Electrical communication can be either one-way communication or two-way communication and can be networked or not networked, and can be wireless if desired. The sensor array 62 can be configured with hardware, with or without software, to perform the assigned task(s). The sensor array 62 include one or more smart sensors such that the sensor array 62 can process the raw data collected by the sensor array 62 prior to transmission to the main controller 60 or the sensor array 62 can be configured as a simple sensor that passes the raw data directly to the main controller 60 without any manipulation of the raw data. The sensor array 62 can be configured to send data to the main controller 60, with or without a prompt from the main controller 60.

While certain embodiments of the invention are described above, it should be understood that the invention can be embodied and configured in many different ways without departing from the spirit and scope of the invention.

For example, embodiments are disclosed above in the context of a lawnmower 10 shown in FIG. 1. However, alternate embodiments can be configured as any appropriate walk-behind self-propelled machine such as but not limited to a tiller, a lawn edger, an aerator, and a snowblower.

In alternate embodiments, any of the first, second and third thresholds can be variable based on any appropriate parameter(s) instead of being predetermined values.

Instead of measuring angular velocity directly, the sensor array 62 can be configured to measure acceleration of the lawnmower 10 as the operator transitions the lawnmower 10 from the row of cut vegetation to a new row for cutting the vegetation. For example, the sensor array 62 can include a multi-axis accelerometer. The main controller 60 can be configured to select one of the first mode and the second mode based on the signal from the multi-axis accelerometer. The sensor array 62 or the main controller 60 can be configured to convert the acceleration data into angular velocity data for comparison to the first, second and third thresholds $\omega_{T1}$, $\omega_{T2}$, $\omega_{T3}$.

Instead of converting the acceleration data from a multi-axis accelerometer into angular velocity data, the first, second and third thresholds can be predetermined acceleration values that can provide the desired operation of the first and second modes.

The data signal generated by a multi-axis accelerometer can include noise that is in addition to or different from the noise described above. Thus, it can be advantageous to either apply an appropriate filter to reduce this possible noise in the raw sensor data or to set the values of the first, second and third thresholds in consideration of this possible additional noise. The filter can be any appropriate software filter or hardware filter or a combination thereof.

Instead of the speed limit dial 54, exemplary embodiments can include any appropriate structure that can permit the operator to set the maximum speed at which the drive assembly 36 will propel the lawnmower. However, alternate embodiments can omit the speed limit dial 54 and the main controller 60 can be configured to modulate the speed at which the drive assembly 36 propels the lawnmower 10 based on a single predetermined maximum speed (possibly set by controller) along with input from operator via the speed control selector 56. In this alternate embodiment, the main controller 61 can be configured to get the single user input from the speed control selector 56 at step S102.

Exemplary embodiments can include a switch, lever, handle throttle device selector or any other appropriate input structure that can permit an operator of the lawnmower 10 to select whether or not the main controller 60 can bypass the second mode and only operate the drive assembly 36 in accordance with the operator's input to the speed limit dial 54 and the speed control selector 56, or the speed control selector 56 alone.

Exemplary embodiments can include a switch, lever selector or any other appropriate input structure that can permit an operator of the lawnmower 10 to cause the main controller 60 to bypass the self-propel mode and to not cause operation the drive assembly 36.

Exemplary embodiments can replace the propulsion motor driver 42 with the main controller 60.

Exemplary embodiments of the lawnmower 10 can include an ON/OFF switch or sleep mode switch. The ON/OFF switch or sleep mode switch can cause each of the blade motor driver 34, the propulsion motor driver 42 and the main controller 60 to power down or go into a sleep mode. Thus, power consumption can be relatively low as compared to normal cutting operations of the lawnmower 10.

Embodiments of the battery pack 30 can be permanently amounted in the housing 28. Alternate embodiments of the walk-behind self-propelled machine can include a battery pack 30 that is removably mounted in the housing 28 so that the battery pack 30 can be electrically connected to a charging source. Further embodiments of the battery pack 30 can include a plurality of battery cells, and the case can be configured to space the battery cells apart from each other in a predetermined pattern. The battery cell(s) can be a rechargeable battery such as but not limited a lithium ion battery or a nickel-metal hydride battery. The case can be made from any appropriate electrically insulating material such as but not limited to electrically insulating plastics, ceramics, or insulated metal.

Instead of the electric blade motor 32, exemplary embodiments of the power source 20 can include an internal combustion engine, or a hybrid of an internal combustion engine and an electric motor.

Instead of the drive transmission 40 and the propulsion motor driver 42, exemplary embodiments of the drive assembly 36 can include a power take-off assembly that can transfer rotary motion of the electric blade motor 32 or an internal combustion engine to the drive shaft 44. The power take-off assembly can include a clutch or slipping belt system that can be modulated by the main controller 60 directly, or via a secondary controller, in accordance with the first mode and the second mode of the main controller 60.

Although the lawnmower 10 is shown and described as including a single blade 22, exemplary embodiments can include a plurality of blades 22. For example, a pair of blades can be concentrically mounted on the blade shaft 24. In another exemplary embodiment, each of the blades can be mounted on a respective blade shaft.

Although the block diagram depicts returning the drive transmission to the on state (or vehicle speed to desired speed) when the first angular velocity is sensed to be less than a third threshold that is different from the first threshold, the controller can also be configured to return the machine to the first mode (transmission on, or motor speed increased) at a different threshold that can be equal to the first threshold, or after both the first and second angular velocities surpass third and fourth respective thresholds that can be equal or different from each other and their respective first and second thresholds.

What is claimed is:

1. A propulsion control system for a walk-behind self-propelled machine including a drive transmission and at least one wheel selectively driven by the drive transmission, the system comprising:
   a sensor array configured to measure a first angular velocity about a first rotational axis of the machine and a second angular velocity about a second rotational axis of the machine, where the second rotational axis is different from the first rotational axis; and
   a controller in electrical communication with the sensor array and configured to place the drive transmission in an off state when,
      the drive transmission is in an on state,
      the first angular velocity is greater than a first threshold, and
      the second angular velocity is greater than a second threshold.

2. The propulsion control system according to claim 1, wherein the controller is configured such that if the controller has placed the drive transmission in the off state based on the first and second angular velocities, the controller maintains the drive transmission in the off state until the first angular velocity is less than a third threshold that is different from the first threshold.

3. The propulsion control system according to claim 1, wherein the controller is configured to place the drive transmission into an on state and to drive the at least one wheel at a speed requested by an operator of the machine when either,
the first angular velocity is less than or equal to the first threshold, or
the second angular velocity is less than or equal to the second threshold.

4. The propulsion control system according to claim 1, wherein the controller is configured such that if the controller has placed the drive transmission into the off state based on the first and second angular velocities, the controller maintains the drive transmission in the off state when,
either a subsequent value of the first angular velocity is less than or equal to the first threshold or a subsequent value of the second angular velocity is less than or equal to the second threshold, and
the subsequent value of the first angular velocity is greater than or equal to a third threshold that is different from the first threshold.

5. The propulsion control system according to claim 1, wherein if the controller has placed the drive transmission into the off state based on the first and second angular velocities, the controller is configured to place the drive transmission into an on state and to drive the at least one wheel at a speed requested by an operator of the machine when,
either a subsequent value of the first angular velocity is less than or equal to the first threshold or a subsequent value of the second angular velocity is less than or equal to the second threshold, and
the subsequent value of the first angular velocity is less than a third predetermined threshold.

6. The propulsion control system according to claim 5, wherein each of the first, second and third thresholds are predetermined values.

7. The propulsion control system according to claim 1, wherein the sensor array includes a three-axis gyroscope in electrical communication with the controller and configured to measure each of the first angular velocity and the second angular velocity.

8. The propulsion control system according to claim 1, wherein the controller is configured to filter a data signal indicative of the first angular velocity and the second angular velocity by applying a first order recursive low-pass filter to the data signal.

9. The propulsion control system according to claim 1, wherein the drive transmission includes an electric motor.

10. A lawnmower comprising:
a cutter housing;
a blade rotatably supported in the cutter housing;
a plurality of wheels supporting the cutter housing;
a handle connected to the cutter housing and extending away from the cutter housing;
a drive assembly mounted to the cutter housing, connected to at least one of the wheels, and configured to selectively drive the at least one wheel; and
a main controller in electrical communication with the drive assembly and configured to
signal the drive assembly based on a comparison of a first angular velocity of the lawnmower to a first threshold and a comparison of a second angular velocity of the lawnmower to a second threshold, where the first angular velocity of the lawnmower is measured about a first rotational axis and second angular velocity of the lawnmower is measured about a second rotational axis that is different from the first rotational axis.

11. The lawnmower according to claim 10, further comprising:
a printed circuit board mounted at the handle, wherein the main controller is mounted on and in electrical communication with the printed circuit board; and
a three-axis gyroscope mounted on and in electrical communication with the printed circuit board, the three-axis gyroscope is in electrical communication with the main controller, and the three-axis gyroscope is configured to output data indicative of each of the first angular velocity and the second angular velocity.

12. The lawnmower according to claim 10, wherein the first rotational axis is substantially orthogonal to the second rotational axis.

13. The lawnmower according to claim 10, further comprising:
a speed limit dial rotatably mounted on the handle, configured to output data indicative of a maximum speed value, and in electrical communication with the controller; and
a speed control selector pivotally mounted on the handle, configured to output data indicative of a speed ratio, and in electrical communication with the main controller, wherein
the main controller is configured to determine the first speed based on the maximum speed value and the speed ratio.

14. The lawnmower according to claim 10, further comprising:
a battery pack mounted on the cutter housing;
an electric blade motor mounted on the cutter housing, connected to the blade and configured to selectively rotate the blade in the cutter housing; and
a blade motor controller in electrical communication with each of the battery pack and the electric blade motor, and configured to regulate and supply power from the battery pack to the electric blade motor.

15. The lawnmower according to claim 14, wherein the drive system includes, an electric propulsion motor, and
a drive controller in electrical communication with each of the main controller, the battery pack, and the electric propulsion motor, and configured to regulate and supply power from the battery pack to the electric propulsion motor such that the electric propulsion motor drives the at least one of the wheels at the first speed when the main controller is in the first mode and at the second speed when the main controller is in the second mode.

16. A lawnmower comprising:
a cutter housing;
a blade rotatably supported in the cutter housing;
a plurality of wheels supporting the cutter housing;
a handle connected to the cutter housing and extending away from the cutter housing;
a drive assembly mounted to the cutter housing, connected to at least one of the wheels, and configured to selectively drive the at least one wheel;
a sensor array configured to measure a first angular velocity about a first rotational axis of the lawnmower and a second angular velocity about a second rotational axis of the lawnmower, where the second rotational axis is different from the first rotational axis, and a controller in electrical communication with the sensor array and the drive assembly, the controller is configured to signal the drive assembly based on a comparison of a first angular velocity of the lawnmower to a first threshold and a comparison of a second angular velocity of the lawnmower to a second threshold, where the second angular velocity is different from the first angular velocity.

17. The lawnmower according to claim 16, the controller is configured to signal the drive assembly into an off state when, the drive assembly is in an on state, the first angular velocity is greater than the first threshold, and a second angular velocity is greater than the second threshold.

18. The lawnmower according to claim 16, wherein the sensor array includes one of, a gyroscope sensor, a first x-axis angular velocity sensor and a second z-axis angular velocity sensor, and a multi-axis accelerometer.

19. A method for controlling a ground speed of the lawnmower according to claim 10, the method comprising:

selecting one of a first mode and a second mode for the controller based on the first angular velocity and the second angular velocity, and causing the drive assembly to drive the at least one of the wheels at a first speed when the controller is in the first mode and at a second speed when the controller is in the second mode, where the second speed is less than the first speed.

20. The method according to claim 19, wherein selecting one of the first mode and the second mode includes, selecting the first mode when the first angular velocity is less than or equal to a first threshold or the second angular velocity is less than or equal to a second threshold, and selecting the second mode when the first angular velocity is greater than or equal to the first threshold and the second angular velocity is greater than a second threshold, maintaining the second mode when a subsequent value of the first angular velocity is less than or equal to the first threshold and is greater than or equal to a third threshold that is different from the first threshold, and terminating the second mode and selecting the first mode when the subsequent value of the first angular velocity is less than or equal to the first threshold and is less than the third threshold.

* * * * *